United States Patent

Matthews

[11] 3,797,856
[45] Mar. 19, 1974

[54] OCCUPANT RESTRAINT SYSTEM
[75] Inventor: Leo J. Matthews, Bloomfield Hills, Mich.
[73] Assignee: General Motors Corporation, Detroit, Mich.
[22] Filed: May 19, 1972
[21] Appl. No.: 255,027

[52] U.S. Cl. .................................... 280/150 AB
[51] Int. Cl. ................................... B60r 21/10
[58] Field of Search..... 280/150 AB; 244/31; 222/3, 222/5

[56] References Cited
UNITED STATES PATENTS
| | | | |
|---|---|---|---|
| 3,663,036 | 5/1972 | Johnson | 280/150 AB |
| 3,197,234 | 7/1965 | Bertrand | 280/150 AB |
| 3,602,527 | 8/1971 | Goetz | 280/150 AB |

*Primary Examiner*—Kenneth H. Betts
*Attorney, Agent, or Firm*—Herbert Furman

[57] ABSTRACT

An occupant restraint system includes an inflator having a generally cylindrical neck which is internally threaded. An externally threaded bushing within the outlet includes a radial rib which seats on the end wall of the neck and an axially extending threaded outlet portion having a centrally apertured radially extending wall providing an inflator outlet. An electron beam welded diaphragm closes the opening in the radial wall and is ruptured by electrically fired detonators. An internally threaded cap member is threaded on the outlet portion of the bushing and engages the rib thereof to axially and telescopically locate the cap member with respect to the wall aperture. The cap member includes a plurality of radially extending equally circumferentially spaced ports located adjacent the outlet. An externally threaded stud extends from the axial end wall of the cap member. A manifold of generally L shape includes an annular end cap portion which includes axially spaced first and second openings. The end cap portion fits over the cap member with the first opening receiving the cap member and seating on the bushing rib and the second opening receiving the stud. A nut threaded on the stud secures the manifold to the inflator. The manifold communicates with a diffuser for inflation of an inflatable occupant restraint cushion when the diaphragm is ruptured and the pressure fluid flows through the radial ports of the cap member to the manifold.

4 Claims, 3 Drawing Figures

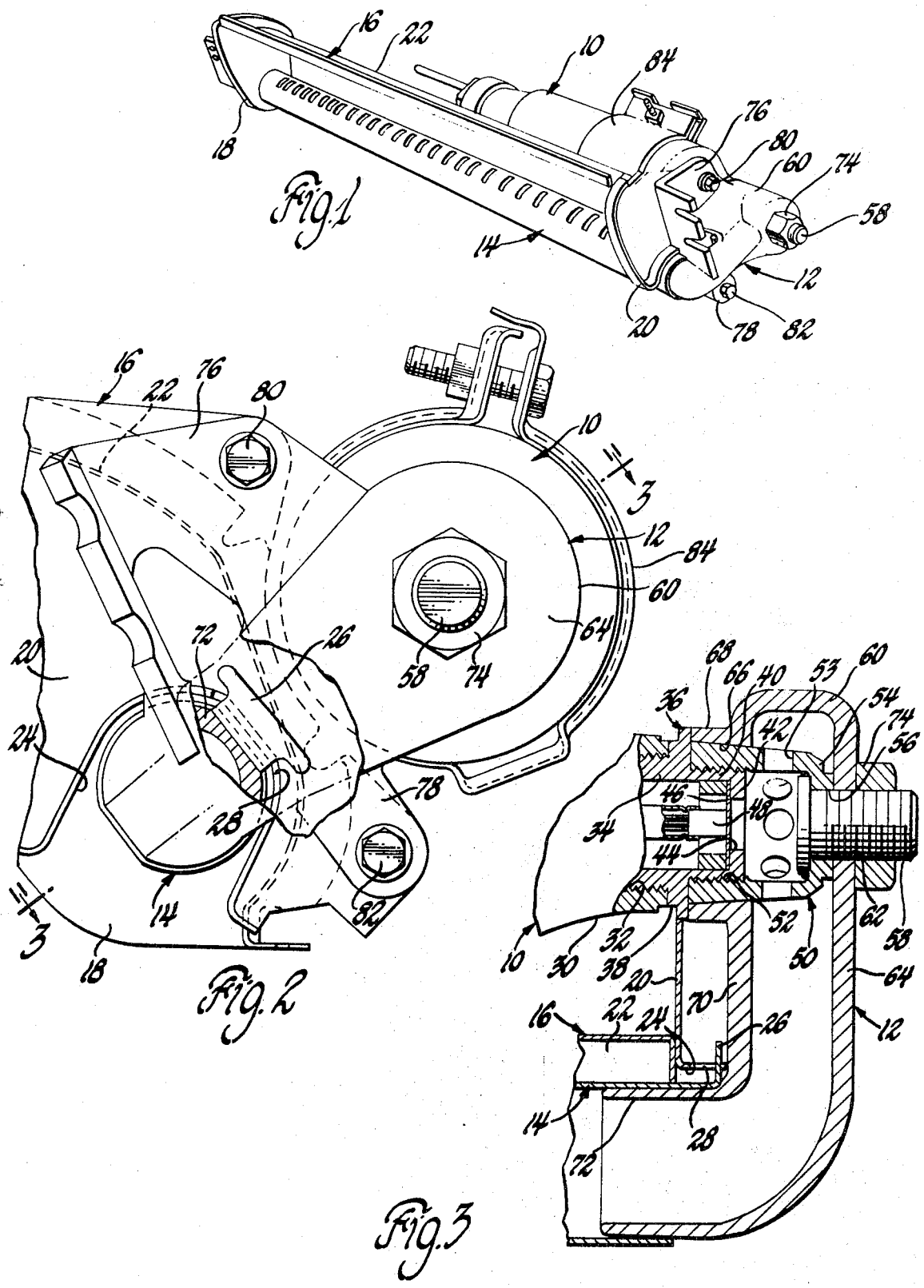

3,797,856

OCCUPANT RESTRAINT SYSTEM

This invention relates generally to an occupant restraint system and more particularly to the attachment of a manifold to an inflator.

Generally, all pressure fluid inflators, such as the so-called pure gas type and the augmented type, include an outlet which is sealed by a rupturable diaphragm and which communicates with a manifold when the diaphragm is ruptured. The manifold is secured in various manners to the inflator and communicates with a diffuser which inflates the inflatable occupant restraint cushion.

One of the features of this invention is that the diaphragm sealed outlet of the inflator is received within a cap member having a plurality of radial ports, with the cap member being received telescopically within an end cap portion of a manifold for communicating the inflator to the manifold through the radial ports upon rupture of the diaphragm. Another feature of this invention is that the cap member has a pilot which is received through an opening in a wall of the end cap portion and is secured to such wall to in turn secure the manifold to the inflator. A further feature of this invention is that the cap member is axially located with respect to the inflator to axially locate the radial ports with respect to the inflator outlet and that the manifold cap portion is also axially located with respect to the inflator outlet to locate the ports with respect to the end cap portion. Yet another feature of this invention is that the cap member is threaded to the outlet of the inflator and seats against a radial rib of such outlet, with the manifold also seating against the same radial rib so that both are located with respect to each other and with respect to the outlet.

These and other features of this invention will be readily apparent from the following specification and drawings wherein:

FIG. 1 is a view of an occupant restraint system having the inflator thereof secured to the manifold according to this invention;

FIG. 2 is an enlarged partially broken away view of a portion of FIG. 1; and

FIG. 3 is a sectional view taken generally along the plane indicated by line 3—3 of FIG. 2.

Referring now particularly to FIG. 1, an occupant restraint system includes an inflator 10 of the augmented type which communicates with a manifold designated generally 12. The manifold in turn communicates with the open end of a diffuser 14 which is housed within a reaction plate assembly 16 including spaced end walls or plates 18 and 20 and a back plate 22. The closed end of the diffuser 14 is conventionally secured to the end plate 18 and the open end of the diffuser is received within a flanged opening 24, FIG. 2, of end plate 20 and is located with respect to assembly 16 by means of a tab 26 of the diffuser being received within a slot 28 of flange 24. As is well known, an inflatable occupant restraint cushion, not shown, is mounted on the diffuser 14 and is inflated from the slotted openings thereof. Additionally, a knee cushion may be mounted within the first cushion and inflated from other slotted openings of the diffuser. The details of such cushions are not shown for purposes of clarity but reference may be had to Cole U.S. Pat. No. 3,610,657 for the details thereof.

As best shown in FIG. 3, the neck 30 of the inflator 10 is internally threaded at 32 and receives the externally threaded portion 34 of a bushing 36, with a rib 38 of the bushing seating on the end of the neck. The bushing 36 further includes an externally threaded outlet portion 40 and an axial end wall 42 which is centrally apertured to provide an inflator outlet 44. A rupturable diaphragm 46 is electron beam welded to the wall 42 to close or seal outlet 44. The diaphragm is conventionally ruptured by electrically fired detonators 48 which are connected to a source of power when the vehicle on which the system is mounted receives a suitable impulse signal due to contact of the vehicle with an obstacle.

A cap member 50 is tapped at 52 and is threaded on the threaded portion 40 of bushing 36 in engagement with the rib 38 to thereby axially locate the cap member with respect to the inflator 10. The cap member 50 includes a series of radially extending equally circumferentially spaced ports or openings 53 and an axial end wall 54 provided with a flanged opening 56. A headed stud or pilot 58 extends through the opening 56 and has its head secured to the wall 54 adjacent the opening.

The manifold 12 includes an annular end cap portion 60 having a first opening 62 in an axial end wall 64 thereof and a second slightly tapered axial opening 66 which is defined in part by a flange 68 of the cap portion extending laterally of an axial end wall 70 thereof. The manifold 12 is generally of L-shaped cross section and includes a slightly tapered open end portion 72 which is received within the open end of the diffuser 14 to thereby communicate the inflator 10 with the diffuser when the diaphragm 46 is ruptured by the detonators 48.

It will be noted from FIG. 3 that the flange 68 seats on the radial rib 38 of the bushing 36 to thereby axially locate the cap portion 60 with respect to the inflator and with respect to the ports 52 of cap member 50. The manifold 12 is secured to the cap member by a nut 74 threaded on the stud 58.

The ports 52 provide an anti-reaction means for the inflator 10 so that the pressure fluid flowing from the inflator to the manifold 12 does not create reaction forces tending to separate the inflator from the manifold.

It can be seen with reference to FIGS. 1 and 2 that the manifold 12 includes laterally extending offset flanges 76 and 78 which are bolted at 80 and 82 respectively to the end plate 20 to secure the manifold 12 to the reaction plate assembly 16. The back plate 22 of this assembly includes a clamp 84 which surrounds the inflator 10 to secure the inflator 10 to the reaction plate assembly.

Thus this invention provides an improved occupant restraint system.

I claim:

1. An occupant restraint system comprising, in combination, an inflator having a generally cylindrical externally threaded outlet provided with an axial opening closed by a rupturable seal, an internally threaded cap member threaded over the outlet and including a plurality of radially opening ports located adjacent the inflator outlet and a pilot extending from the axial end wall thereof, a manifold including an annular end cap portion having axially spaced openings for respectively receiving an inserted portion of the cap member and the pilot of the end wall thereof, and means securing the manifold to the pilot of the end wall of the cap member.

2. An occupant restraint system comprising, in combination, an inflator having a generally annular outlet provided with an axial opening closed by a rupturable seal, an annular cap member having a plurality of radially open-ports and receiving a portion of the inflator outlet therewithin, cooperating means on the inflator outlet and cap member for axially locating the radial ports and axial opening with respect to each other, means securing the cap member to the inflator, a manifold including an annular end cap portion telescopically receiving the cap member therewithin and including an axial end wall juxtaposed to an axial end wall of the cap member, and cooperating means on the juxtaposed axial end walls for securing the manifold to the cap member.

3. An occupant restraint system comprising, in combination, an inflator having a generally cylindrical outlet provided with a radially extending rib and an axial opening closed by a rupturable seal, an annular cap member having a plurality of radially opening ports and receiving the inflator outlet therewithin, the cap member engaging the rib to locate the opening and ports with respect to each other, means securing the cap member to the inflator, a manifold including an annular end cap portion telescopically receiving the cap member therewithin and engaging the rib to locate the ports within the cap portion, the cap portion including an axial end wall juxtaposed to an axial end wall of the cap member, and cooperating means on the juxtaposed axial end walls for securing the manifold to the cap member.

4. An occupant restraint system comprising, in combination, an inflator having a generally annular outlet provided with an axial opening closed by a rupturable seal, an annular cap member having a plurality of radially opening ports and an axial opening for receiving an inserted portion of the inflator outlet therewithin, means securing the cap member to the inflator, a manifold including an annular end cap portion having an axial opening for receiving an inserted portion of the cap member therewithin and an opposite apertured axial end wall juxtaposed to an axial end wall of the cap member, a threaded pilot on the axial end wall of the cap member extending through the apertured axial end wall of the end cap portion, and a nut threaded on the pilot to secure the manifold to the cap member.

* * * * *

PO-1050
(5/69)

UNITED STATES PATENT OFFICE
CERTIFICATE OF CORRECTION

Patent No. __3,797,856__   Dated __March 19, 1974__

Inventor(s) __Leo J. Matthews__

It is certified that error appears in the above-identified patent and that said Letters Patent are hereby corrected as shown below:

Column 2, line 56, delete "ex-"; line 57, delete "ternally"; line 57, after "opening" insert a comma (,); line 58, delete "closed by a rupturable seal, an internally" and substitute -- a --; line 59, delete "over" and substitute -- to --; line 62, after "thereof," insert -- rupturable seal means blocking communication between the inflator outlet and cap member, -- .

Column 3, line 18, after "rib" insert a comma (,); line 18, delete "and an axial"; line 19, delete "opening closed by a rupturable seal,"; line 21, delete "receiving" and substitute -- communicating with --; line 21, delete "therewithin"; line 24, after the comma insert -- rupturable seal means blocking communication between the inflator outlet and cap member, -- .

Column 4, line 9, delete "annular" and substitute -- axial --; line 10, delete in its entirety; line 11, delete "seal"; line 12, delete "for receiving an" and substitute -- communicating with --; line 13, delete "inserted portion of"; line 13, delete "therewithin" and substitute -- rupturable seal means blocking communication between the inflator outlet and cap opening, -- .

Signed and sealed this 5th day of November 1974.

(SEAL)
Attest:

McCOY M. GIBSON JR.
Attesting Officer

C. MARSHALL DANN
Commissioner of Patents